United States Patent Office

Re. 25,777

Reissued May 11, 1965

25,777

METHOD FOR PREPARING ALKALI-METAL BOROHYDRIDES

Friedrich Schubert and Konrad Lang, Leverkusen, Werner Schabacher, Cologne-Mulheim, and Alex Burger, Leverkusen, Germany, assignors to Farbenfabriken Bayer Aktiengesellschaft, Leverkusen, Germany, a corporation of Germany No Drawing. Original No. 3,077,376, dated Feb. 12, 1963, Ser. No. 753,204, Aug. 5, 1958. Application for reissue Jan. 20, 1964, Ser. No. 348,317

Claims priority, application Germany Aug. 12, 1957

10 Claims. (Cl. 23—14)

Matter enclosed in heavy brackets [ ] appears in the original patent but forms no part of this reissue specification; matter printed in italics indicates the additions made by reissue.

The present invention relates to a new process for the production of alkali metal borohydrides of boranates.

A number of publications describe the production of boranates and in these publications, boron halides, boron halide complexes, organic boron compounds or boric acid anhydride serve as the boron-containing starting materials. These materials are all expensive and some of them are difficult to handle.

In copending application Ser. No. 704,362, which was filed December 23, 1957, in the name of Dieter Goerrig, Werner Schabacher, and Friedrich Schubert, *now U.S. Patent 3,140,150,* there is described a process for the production of boranates, wherein a hydride of one of the metals Al, Mg, Ca, Sr, Ba, Li, Na, K, (Rb, Cs) is reacted with a compound selected from the group consisting of metaborates and metal oxide boron oxide mixtures of comparable composition of a metal of the above series which is not further to the left in the said series than the hydride metal, the reaction taking place at temperatures above 100° C. and below the melting point of the mixture, the boranate of the metaborate metal and the oxide of the hydride metal being formed.

In accordance with the present invention alkali metal borohydrides or boranates are produced by heating an alkali metal borate or an alkaline earth metal borate or mixture thereof or also mixtures of alkali metal oxide or alkaline earth metal oxide and boron oxide of the composition $$Me_2O:B_2O_3\left[\begin{matrix}<\\=\\>\end{matrix}\right]\begin{matrix}\leq\\ \geq\end{matrix}1:1$$

with an hydriding agent i.e. an alkali metal hydride or a mixture of an alkali metal and hydrogen to a temperature between about 100 and about 1000° C. To obtain optimum results the reactants are mixed in such a proportion that upon each atom of boron present in the reaction mixture at least four atoms of an alkali metal are present and four atoms of hydrogen. The reaction can be performed with or without the application of a superatmospheric pressure of hydrogen at temperatures between about 100° C. and about 1000° C. In most cases it is preferable to employ temperatures between about 300° C. and about 600° C.

As starting materials borate minerals such as borax or tinkal $Na_2B_4O_7.10H_2O$, kernite $Na_2B_4O_7.4H_2O$, colemanite $Ca_2B_6O_{11}.5H_2O$, boronatrocalcite $$CaNaB_5O_9.6H_2O,$$

ulexite $NaCaB_5O_9.8H_2O$ and boracite $Mg_7Cl_2B_{17}O_{30}$ come into consideration. It is for the first time made possible by the present invention to obtain alkali metal borohydrides or boranates while starting from naturally occurring borate minerals. It is self-evident that also synthetic mixtures of alkali metal oxides or alkaline *earth* metal oxides, or respective compounds yielding oxides during the reaction in admixture with boron oxide can be used as starting materials for the present invention. The yield of the reaction of an alkali metal borate or an alkaline earth metal borate with an alkali metal hydride or with an alkali metal and hydrogen can be improved if the reaction is carried out in the presence of certain additives. These additives can be divided into two groups:

(a) Substances which react chemically with the metal oxide formed. Examples are calcium chloride (formation of MeCl+CaO), and acid anhydrides, such as $SiO_2$. In many cases it is advantageous to prepare a borosilicate by sintering or fusing for instance borax and quartz and react in a second step this glass or sinter with a mixture of e.g. sodium and hydrogen or sodium hydride.

(b) Chemically inert substances which dilute the reaction mixture; these also have a reaction-promoting effect. Common salt and feldspar are mentioned from the large number of substances to be considered for this purpose.

EXAMPLE 1

An intimate mixture of 201 g. of dehydrated borax ground in a ball mill, 368 g. of metallic sodium and 420 g. of extremely finely powdered quartz is heated for about 2–4 hours at 500° C. in a stirrer-type autoclave under a hydrogen pressure of 3 atm. The resulting reaction product is extracted with liquid ammonia. Sodium boranate with a 96% NaBH content is obtained in an excellent yield upon evaporation of the ammonia.

Sodium metasilicate is formed as a secondary product in accordance with the equation:

$$Na_2B_4O_7+16Na+7SiO_2+8H_2=NaBH_4+7Na_2SiO_3$$

which can profitably be put to known industrial uses.

EXAMPLE 2

An intimate mixture of 201 g. of dehydrated borax ground in a ball mill, 368 g. of metallic sodium and 400 g. of feldspar is stirred for 4 hours at 450° C. in a stirrer-type autoclave under a hydrogen pressure of 3 atm. The cooled reaction product is extracted with liquid ammonia. Sodium boranate with a $NaBH_4$ content exceeding 96% is obtained in an excellent yield upon evaporation of the ammonia.

EXAMPLE 3

400 grams of dehydrated borax and 850 grams of quartz powder are heated to a temperature between 1000 and 1100° C. for 6 hours in a refractory crucible and cooled. The glass obtained is finely ground in a ball mill, then introduced together with 740 grams of sodium into a stirrer-type autoclave and heated therein to a temperature between 450 and 500° C. for 4 hours under a hydrogen pressure of 4 atmospheres. The reaction product is extracted with liquid ammonia. Sodium boranate is obtained after evaporation of the ammonia in an almost quantitative yield.

EXAMPLE 4

125.7 grams of calcium borate, 250 grams of quartz powder and 184 grams of sodium are heated first to 350° C. and intimately mixed in a stirrer-type autoclave, then heated to a temperature between about 450 C. and 500° C. for 4 hours under a hydrogen pressure of 4 atmospheres. After cooling the reaction product, sodium boranate is extracted therefrom in a very good yield with liquid ammonia. Sodium boronate with a $NaBH_4$-content between 96 and 99% by weight is obtained after evaporating the ammonia.

EXAMPLE 5

260 grams of dehydrated ulexite $NaCaB_5O_9$ are sintered together with 480 grams of quartz powder at about 1000° C. The product which is finely ground after cooling is heated in a stirrer-type autoclave together with 460 grams of sodium under a hydrogen pressure of 3 (4) atmospheres. At 390° C. a reaction sets in which can be seen from a transient increase in temperatures to 540° C. The temperature is kept at 450° C. by appropriately heating. After the absorption of hydrogen is complete, the mixture is allowed to cool in a hydrogen atmosphere and the sodium boranate obtained in an optimum yield according to the equation $$NaCaB_5O_9.8SiO_2+20Na+10H_2\rightarrow 5NaBH_4+8Na_2SiO_3+CaO$$

is isolated as described in Example 1.

We claim:

1. A process for the production of an alkali metal borohydride which comprises preparing a reaction mixture of an alkali metal, hydrogen and a member selected from the group consisting of borax ($Na_2B_4O_7.10H_2O$) *dehydrated borax,* cernite ($Na_2B_4O_7.4H_2O$), colemanite ($Ca_2B_6O_{11}$), boronatrocalcite ($CaNaB_5O_9$), and boracite ($Mg_7Cl_2B_{17}O_{30}$), heating said reaction mixture to a temperature between about 100 and 1000° C. and recovering the alkali metal borohydride thereby formed.

2. Process according to claim 1, in which the reaction mixture contains the reactants in such a proportion that for each atom of boron at least four atoms of an alkali metal and four atoms of hydrogen are present.

3. Process according to claim 1, which comprises effecting the reaction at a temperature of between about 300 and 600° C.

4. Process for the production of sodium borohydride by heating desiccated borax with sodium and hydrogen in the presence of quartz powder in the proportions given by the equation:

$$Na_2B_4O_7+16Na+7SiO_2+8H_2=4NaBH_4+7Na_2SiO_3$$

under a hydrogen super pressure of 3 atm. to a temperature of about 500° C. for a period of about 2–4 hours and recovering sodium borohydride from the reaction mixture.

5. Process for the production of sodium borohydride which comprises heating calcium borate with sodium and hydrogen in the presence of quartz powder under a hydrogen pressure of 4 atmospheres to a temperature of about 500° C. for a period of about 2–4 hours and recovering sodium borohydride from the reaction mixture.

6. Process for the production of sodium borohydride which comprises heating ulexite ($NaCaB_5O_9$) with sodium and hydrogen in the presence of quartz powder under a hydrogen pressure of 3–4 atmospheres to a temperature of about 400 to 500° C. until the absorption of the hydrogen is complete and recovering sodium borohydride from the reaction mixture.

7. Process according to claim 4 which comprises in a first step heating together desiccated borax and quartz powder to a temperature between 1000 and 1100° C. and thereafter in a second step reacting the resulting borosilicate product with sodium and hydrogen under a hydrogen super pressure of 3 atmospheres to a temperature of about 500° C. for a period of about 2 to 4 hours and recovering the sodium borohydride thereby formed from the reaction mixture.

8. Process according to claim 6 which comprises in a first step heating together ulexite ($NaCaB_5O_9$) and quartz powder to a temperature between 1000 and 1100° C. and thereafter in a second step reacting the resulting borosilicate product with sodium and hydrogen under a hydrogen super pressure of 3 atmospheres to a temperature of about 500° C. for a period of about 2 to 4 hours and recovering the sodium borohydride thereby formed from the reaction mixture.

*9. Process for the production of sodium borohydride which comprises reacting a borosilicate glass selected from the group consisting of alkali metal borate-silicon dioxide borosilicate glass and alkaline earth metal borate-silicon dioxide borosilicate glass with sodium and hydrogen at a temperature between 300 and 600° C. and recovering the sodium borohydride from the reaction mixture.*

*10. Process according to claim 9 in which said sodium and hydrogen are added in the form of sodium hydride.*

References Cited by the Examiner

The following references, cited by the Examiner, are of record in the patented file of this patent or the original patent.

UNITED STATES PATENTS 2,372,670 4/45 Hansley.

FOREIGN PATENTS 1,120,228 4/56 France.
548,676 11/57 Canada.

OTHER REFERENCES

Jones: "Inorganic Chemistry," 1947, pages 574–577.
Mellor: "Comprehensive Treatise on Inorganic and Theoretical Chemistry," 1925, vol. VI, pages 447, 451, 522.

MAURICE A. BRINDISI, *Primary Examiner.*